(12) United States Patent
Williams et al.

(10) Patent No.: US 9,225,387 B2
(45) Date of Patent: Dec. 29, 2015

(54) ANALYSIS OF CAPTURED SIGNALS TO MEASURE NONLINEAR DISTORTION

(71) Applicant: Cable Television Laboratories, Inc., Louisville, CO (US)

(72) Inventors: Thomas H. Williams, Longmont, CO (US); Belal Hamzeh, Westminster, CO (US)

(73) Assignee: Cable Television Laboratories, Inc., Loiusville, CO (US)

( * ) Notice: Subject to any disclaimer, the term of this patent is extended or adjusted under 35 U.S.C. 154(b) by 0 days.

(21) Appl. No.: 14/184,619

(22) Filed: Feb. 19, 2014

(65) Prior Publication Data

US 2015/0043624 A1 Feb. 12, 2015

Related U.S. Application Data

(63) Continuation-in-part of application No. 13/963,957, filed on Aug. 9, 2013.

(51) Int. Cl.
H04L 25/34 (2006.01)
H04B 3/46 (2015.01)
H04W 24/08 (2009.01)

(52) U.S. Cl.
CPC *H04B 3/46* (2013.01); *H04W 24/08* (2013.01)

(58) Field of Classification Search
None
See application file for complete search history.

(56) References Cited

U.S. PATENT DOCUMENTS

| 6,344,749 | B1 | 2/2002 | Williams |
| 6,570,394 | B1 | 5/2003 | Williams |
| 6,687,632 | B1 | 2/2004 | Rittman |
| RE40,322 | E | 5/2008 | Williams |
| 7,415,367 | B2 | 8/2008 | Williams |
| 2004/0032296 | A1 | 2/2004 | Akaiwa |
| 2005/0233702 | A1* | 10/2005 | Ferguson ............ 455/67.14 |
| 2013/0215953 | A1 | 8/2013 | Currivan et al. |
| 2014/0140522 | A1 | 5/2014 | Deng |

OTHER PUBLICATIONS

Invention Disclosure, CableLabs Inventions, Apr. 10, 2012, www.cablelabs.com/about/inventions/, 2 pages.
Campos et al., "DOCSIS—Upstream Cable Echoes Come in Two Flavors," CED magazine, May 1, 2010, 7 pages.
Simons, "Technical Handbook for CATV Systems," Third Edition, Publications Department of General Instruments, Jerrod division, 1983, Chapters 4 and 5, p. 1-109.
Campos et al., "Testing for Nonlinear Distortion in Cable Networks," Cable Television Laboratories, Inc., Oct. 2013, pp. 1-16.
Office Action for U.S. Appl. No. 13/963,957 mailed Jan. 15, 2015, 10 pages.
Notice of Allowance issued in U.S. Appl. No. 13/963,957 mailed on Jul. 24, 2015, 8 pages.

* cited by examiner

*Primary Examiner* — Adolf Dsouza
(74) *Attorney, Agent, or Firm* — Davis Wright Tremaine LLP

(57) ABSTRACT

A method to test a signal path with vacant bandwidth by sending a test signal twice and processing two resulting nonlinear distortion signals captured in the vacant bands to determine presence of nonlinear distortion. If the signals correlate, the energy in the vacant bands is nonlinear distortion. If the test signal is sent followed by an inverse (in time-domain) of itself, and a resulting correlation peak is negative, the nonlinear distortion is determined to have been created by odd-order nonlinear distortion.

39 Claims, 14 Drawing Sheets

ANALYSIS OF CAPTURED SIGNALS TO MEASURE NONLINEAR DISTORTION

CROSS REFERENCE TO RELATED APPLICATION

This application is a continuation in part application of U.S. patent application Ser. No. 13/963,957, filed Aug. 19, 2013, entitled "Analysis of Captured Random Data Signals to Measure Linear and Nonlinear Distortions," referred to hereinbelow as the "parent application."

BACKGROUND OF THE INVENTION

This invention relates to the detection of nonlinear distortions in equipment, such as those used in in cable and wireless systems, as well as in other applications.

Nonlinear distortions are frequently generated in equipment used in cable systems, and in wireless systems. Thus, nonlinear distortions such as second, third or higher order distortion signals may for example be generated by (over-driven) amplifiers, clipped analog lasers, or overloaded A-D converters, or nonlinear elements in a signal path. Excessive nonlinear distortion in a transmitter or signal path results in received signals with high modulation error rate (MER), which results in a high packet error ratio.

SUMMARY OF THE INVENTION

One embodiment of the invention is directed to a method for determining the presence of nonlinear distortion in a signal transmitted from a source and received at a site. The method comprises transmitting a first signal from the source to the site, said first signal associated with a first vacant bandwidth. After the first signal has been transmitted, a second signal from the source is transmitted to the site, the second signal being a known mathematical function of the first signal and associated with a second vacant bandwidth. First vacant band signal samples are obtained in the first vacant bandwidth from the first signal received at the site and second vacant band signal samples are obtained in the second vacant bandwidth from the second signal received at the site. The first and second vacant band signal samples are processed to arrive at processed signal samples and to measure nonlinear distortion in the first and second signals that arrive at the site.

Another embodiment is directed to a method for determining the presence of nonlinear distortion in a signal transmitted from a source and received at a site, which comprises transmitting a comb signal from the source to the site, said comb signal associated with two vacant bandwidths. The comb signal transmitted from the source and received at the site is captured. A signal sample is obtained from the comb signal received at the site in each of the two vacant bandwidths to create two vacant band signal samples, which are processed to measure nonlinear distortion in the comb signal received at the site.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 7 is a graphical illustration of the result of the processing of the FD signals in FIGS. 6A, 6B obtained where two substantially identical signal bursts were sent with a time offset there between.

FIG. 8 is a graphical illustration of the result of the processing of the FD signals in FIGS. 6A, 6B obtained where a signal burst and its inverse were sent with a time offset there between.

FIG. 9A is a flow chart illustrating the steps of processing the captured signals where two substantially identical signal bursts were sent with a time offset there between.

Identical components are labeled by the same numerals in this document.

DETAILED DESCRIPTION OF EXEMPLARY EMBODIMENTS

Figure 1A:
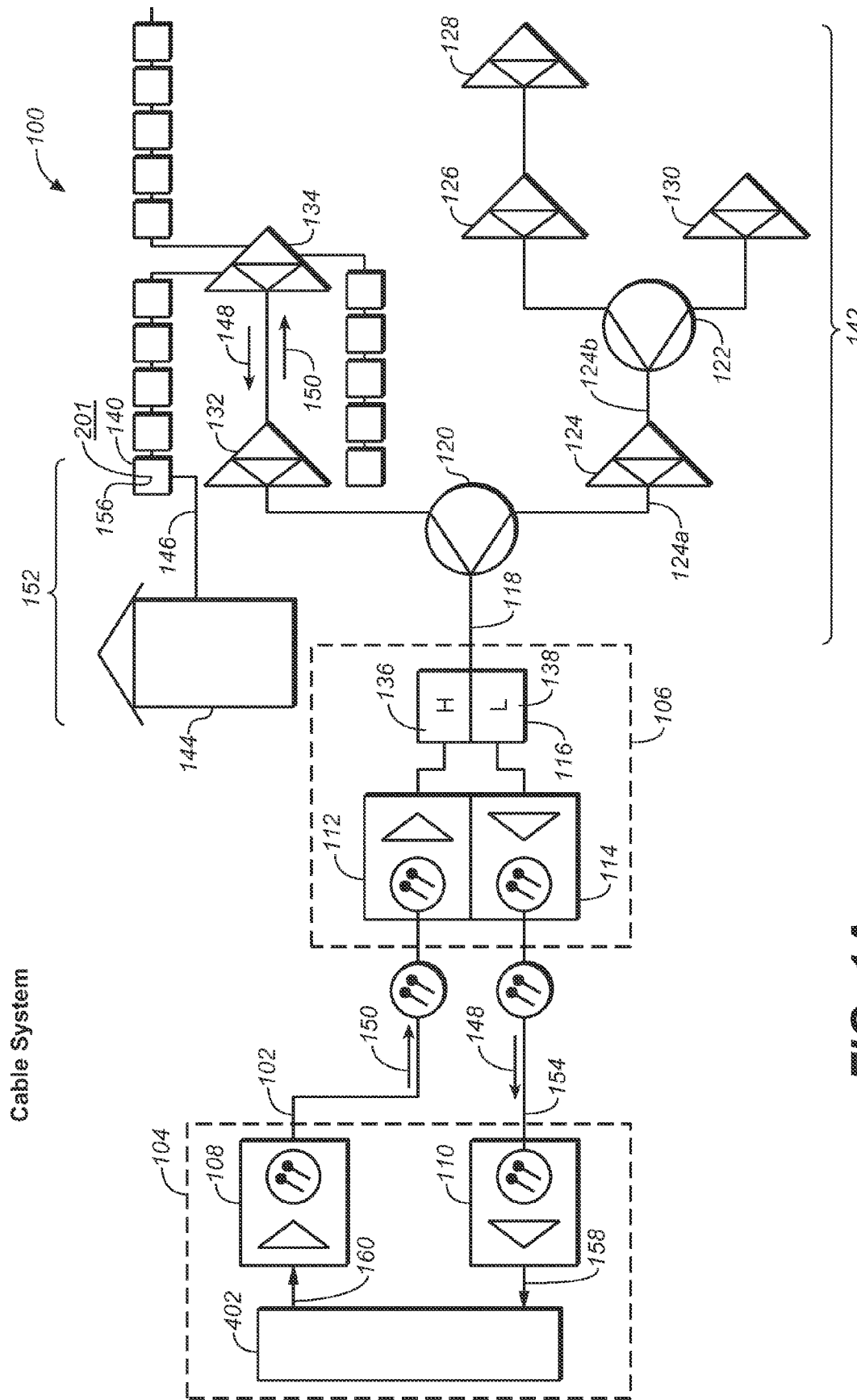
FIG. 1A is a block diagram of a simplified bi-directional hybrid fiber optic coaxial cable system useful for illustrating one embodiment of the invention.

One implementation of an embodiment is directed to a method for determining the presence of nonlinear distortion in a signal transmitted from a source, propagating through a signal path, and received at a site. This signal is comprised of a first burst with a first vacant band, an identical second burst with a second vacant band, and a known time difference (or time delta) between the first burst and the second burst. The first vacant band is chosen to be frequencies that would contain nonlinear distortion signals (energy) if a first nonlinear distortion signal was created by the first burst, or a second nonlinear distortion signal was created by the second burst. At a receive site both bursts and both nonlinear distortion energy are captured in a continuous capture buffer and first nonlinear distortion signal from the first vacant band is processed with the second nonlinear distortion signal from the second vacant band to determine if the first nonlinear distortion signal matches the second nonlinear distortion signal. A match indicates the first and second bursts both made identical nonlinear distortion.

The signal bursts transmitted may be genuine data signals or fabricated test signals. Nonlinear distortion may be caused by the transmitter used for transmitting the signal bursts, the transmission signal path, or the receiving device at the site receiving the transmitted signal. It should be noted that the vacant band referred to above is a band with no other signal that is intentionally transmitted, such as data signals or fabricated test signals; although an unintentional signal such as ingressing uncorrelated energy, random noise, or nonlinear distortion may be present. Generally vacant bands are chosen to be frequencies where one would expect to observe nonlinear distortions.

In a second implementation of an embodiment the second burst is inverted (in the time domain) relative to the first burst. An inverted match indicates the nonlinear distortion was created by an odd-order nonlinear distortion, such as 3rd order, or 5th order. Noninverted match indicates the nonlinear distortion was created by an even-order nonlinear distortion, such as 2nd, 4th, or 6th order.

In a third implementation of an embodiment a measured transmission, can be employed to determine the presence of nonlinear distortion by additionally distorting the measured transmission to make a manufactured distortion. The manufactured distortion is processed with the measured transmission to determine the presence of nonlinear distortion. The method is less sensitive relative to using a vacant band accompanying said measured transmission, but in some signals, no vacant band is available.

In a fourth implementation of an embodiment, a measured transmission can be employed to determine the presence of nonlinear distortion by transmitting a comb signal. The components in the upper and lower adjacent vacant bands are processed to determine the presence of nonlinear distortion. Additionally, the use of various forms of the comb signal enables detailed classification of the distortion being created (i.e. second order, third order, etc. . . . ).

In a fifth implementation of an embodiment, signal energies in vacant bands are processed to determine the presence of underlying interference or ingress signals. Two captures of the energy in the vacant band are processed to determine the presence of ingress signals or interference which is not attributed to thermal noise or additive white Gaussian noise.

In cable systems, two-way hybrid fiber coax (HFC) cable systems typically provide two-way communications for end users (typically homes or businesses) using both coaxial cable and fiber optic cable. A headend is a collection point for downstream signals and a termination point for upstream signals. "Downstream" or "forward" means signals traveling away from the headend and "upstream" or "reverse" means signals traveling toward the headend. The coaxial portion of cable networks uses a tree-and-branch architecture to split downstream signals and combine upstream signals. On the coaxial portion of the cable plant, downstream signals are sent from a headend to an end user in a downstream frequency band, which may be 54 to 860 MHz. The composite downstream signal is typically comprised of analog television signals in the lower frequencies, such as 54 to 550 MHz, and digital television signals and cable modem traffic in the upper frequency band, such as 550 to 860 MHz. Upstream signals travel from the end users to the headend in the 5 to 42 MHz upstream frequency band over the same coaxial cable that is used for downstream communications. There is current discussion about changing the split frequencies from 42/54 MHz to possibly 85/108 MHz. The fiber portion of the plant transports signals a long distance to a cluster of subscribers in a group called a node. The point at which the downstream fiber optic (light) signals are converted to downstream electrical signals for transmission over coaxial cable is called a fiber node. The upstream electrical signals are also converted into fiber optic signals at the fiber node for transmission back to the headend. In larger plants there may be additional signal distribution/collection points called "hubs". In the United States the downstream is typically divided into 6 MHz channels that may contain analog NTSC carriers or digital carriers. Normally, upstream channel width and frequency spacing is not uniform FIG. 1A is a drawing of a hybrid fiber coax (HFC) cable system 100 useful for illustrating one implementation of an embodiment of the invention. The origination/terminating point for cable signals is a hub site 104. In large cable systems multiple hub sites will connect back to a central headend (not illustrated). For purposes of this discussion the terms headend and hub can be used interchangeably. Inside hub site 104 is a cable modem termination system (CMTS) unit 402 and a fiber optic transmitter 108 and fiber optic receiver 110. Fiber optic cables 102 and 154 connect the hub site to remote fiber optic nodes, such as fiber optic node 106 which can be 50 kilometers away. Typically different fiber optic cables are used for the downstream direction and the upstream direction. At a fiber node, the optic signals are converted to/from RF (radio frequency) electrical signals and distributed over coaxial cable 118. Commonly, an analog laser is used in the fiber optic transmitter 108. Downstream radio frequency signals 150 flow in the 54 to 860 MHz band from the fiber node to the end points that may be homes 144 with terminals such as cable modems (CMs) (not illustrated). Upstream signals 148 flow in the 5-42 MHz band from the end points back to the fiber nodes. Cascaded two-way amplifiers 124, 126, 128, 130, 132, and 134 boost the RF signals as needed to compensate for splitting and cable losses. Simultaneous two-way amplification of signals is possible because the two-way amplifiers have diplex filters, which separate downstream and upstream signals. Splitters 120 and 122 and directional couplers are used to create a tree-and-branch architecture. Signals are extracted from, and inserted into the cable lines by taps 140 to provide signals to end points with terminals. The connections between taps and homes are normally done with flexible coaxial cable called drop cable 146. In different parts of the world HFC systems are used with different frequency splits and different construction practices. Amplifiers, such as amplifier 124 typically have input test points, such as input test point 124*a* and output test points, such as output test point 124*b*.

In the past, the downstream signals have been primarily analog television signals, but over time have transitioned to mostly digital signals. The digital downstream signals are 6 MHz in width in the US, and 8 MHz in Europe and digital signals may carry entertainment, Internet traffic, or phone traffic. Likewise, wireless signals to/from cell sites can be transported over the lines. Much of the Internet digital traffic is transported via the DOCSIS® (data over cable service interface specification) specification.

Terminals have developed significantly more processing power and capability in recent years. In particular, they have developed a full-band capture capability where a very high-speed analog-to-digital converter (A-D) digitizes the full band input signal and can store samples of the signal as well as perform DSP operations, such as digital filtering and fast Fourier transforms, on the captured samples.

DOCSIS specification defines a bridging (or routing) system to use the 2-way cable plant to provide Internet Protocol connectivity. In the downstream one or more downstream 6 MHz channels are used to provide broadcast-type connectivity between a CMTS in a hub and multiple CMs in homes. As mentioned above, current digital carriers are 6 MHz wide and may be 64 or 256-QAM. Future downstream DOCSIS specifications plan to use OFDM (orthogonal frequency-division multiplexing) with up to a 192 MHz channel width.

Upstream transmissions are generally controlled by the CMTS and are sent in bursts with transmission opportunities being assigned in "minislots" to requesting CMs via a map message over the downstream plant. Upstream burst transmissions are currently QAM (quadrature amplitude modulation) occupying 3.2 or 6.4 MHz. The modulation order of the QAM signals may be QPSK up to 64 QAM. Future upstream DOCSIS specifications plan to use OFDMA (orthogonal frequency-division multiple access) with up to a 96 MHz channel width.

Downstream test signals, commonly called "sweep" signals are injected at the hub site at connection 160 before the laser transmitter. The downstream test signals may be received anywhere in the downstream plant, but are commonly received at tap ports on tap 140, amplifier test points such as output test point 124b, or inside the home 144. Upstream test signals are injected at endpoints, such as tap 140, and received in the hub site at an RF output from the upstream fiber receiver 110, such as connection 158. CMs, working with CMTSes, currently provide information that is useful for downstream and upstream analysis. Information includes such details as MER on channels, corrected and uncorrected FEC (forward error correction) frames, signal levels, full-band upstream and downstream spectrum, and programming for upstream pre-distortion equalization coefficients upstream noise, etc. The SNMP (simple network management protocol) is commonly used to provide information to queries from a network management system. Currently linear distortion information is available on both the upstream and downstream links, but not nonlinear information.

Cable uses a tree-and-branch architecture within a node. That means that the downstream signal is repeatedly split to give many good copies of the original signal. In the upstream direction, noise as well as signals from each house and drop cable is combined to create a problem referred to as "noise funneling". Thus maintaining upstream signal quality at the CMTS is difficult. Making the problem even harder is the transient nature of the signals, interference and a resulting lack of knowledge about where and interference originated. It is thus desirable to provide a technique by which it is possible to identify nonlinear distortion present in the upstream signal path.

Figure 1B:
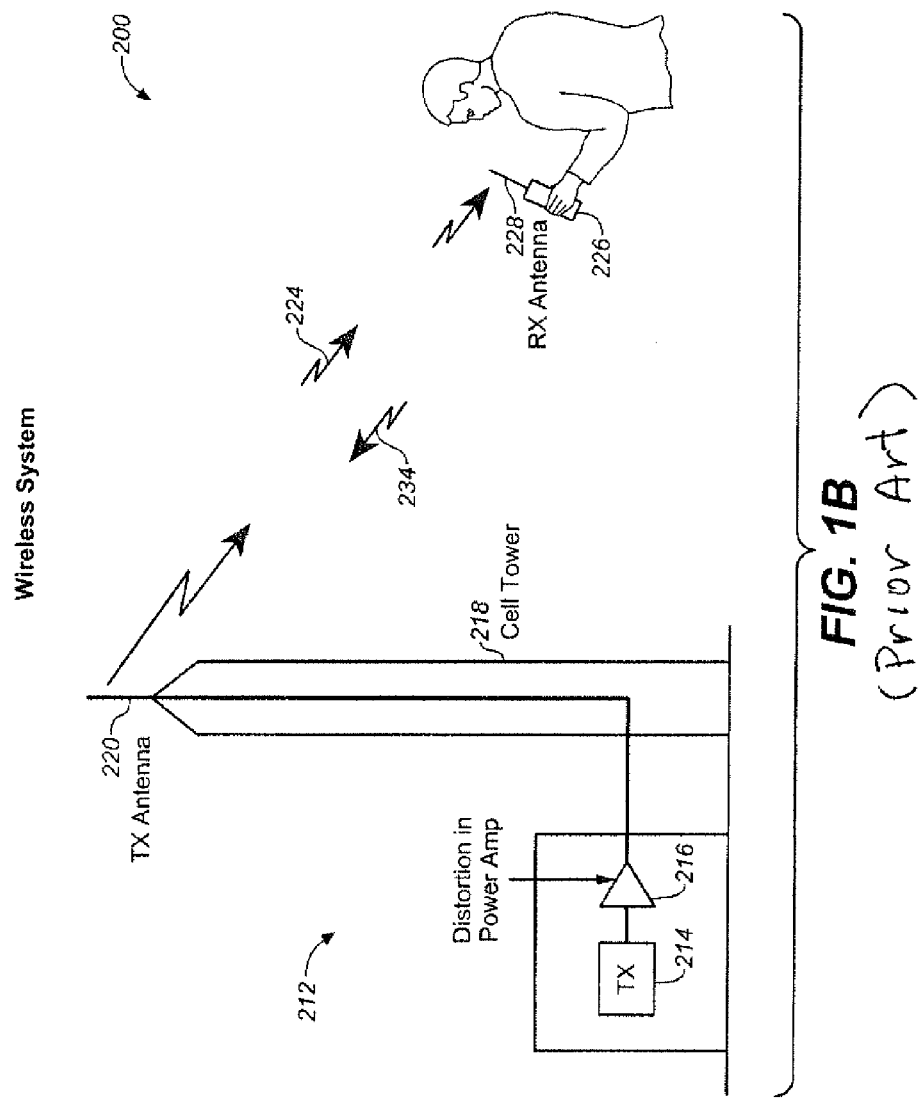
FIG. 1B is a drawing of a wireless system.

FIG. 1B is a drawing of a wireless system 200. The wireless system is comprised of a base station 212 with a transmission source 214, a power amplifier 216 that can create nonlinear distortion, a cell tower 218 with an antenna 220, a wireless signal path 224, and a hand-held unit 226 with an antenna 228. The hand-held unit contains a downstream receiver and an upstream transmitter. In upstream transmission, the upstream transmitter in hand-held device 226 transmits radio frequency (RF) signals along wireless path 234 to the cell tower 218 which receives the RF transmission through antenna 220. The upstream transmitter creates nonlinear distortion, particularly when the upstream transmitter is operating at a maximum range and is using full transmit power. Thus it is desirable to know if either the base station power amplifier or the transmitter in the hand-held unit is making nonlinear distortion. Nonlinear distortion may also be created in the downstream wireless signal path as well by the components in the path and can benefit from the embodiments of the invention for determining nonlinear distortion.

Discussion Nonlinear Distortion

Nonlinear distortions are discussed in Reference 2, which is "Technical Handbook for CATV Systems" (by Ken Simmons, Third edition, Publications Department of General Instruments, Jerrod Division, 1983) in chapters 4 and 5. While linear distortions do not create signals at new frequencies relative to the input signal, nonlinear distortions do.

Nonlinear distortion can be modeled as a Taylor series expansion of a time series signal. A nonlinearly distorted signal could be modeled as:

$$E_{out} = A\,E_{in} + B\,E_{in}^2 + C\,E_{in}^3 + \qquad(1)$$

Where $E_{in}$ is a time-varying input signal, $E_{out}$ is a resulting output signal, A is the linear amplification term, B is a second order term responsible for creating second-order distortions, and C is a third order term responsible for creating third-order distortions. In Cable and wireless systems 100, 200, where multiple signals are present at different frequencies, nonlinear distortion energy in any frequency band can be created from many other signals in other frequency bands. In Cable, composite second order (CSO) is the term used to describe energy created by the "B" term in equation (1) and composite triple beat (CTB) is the term used to describe the energy created by the "C" term in equation (1).

In modern Cable systems, which use push-pull amplifiers to cancel the second order distortion, CTB created by the "C" term should be the dominant distortion.

Figure 2A:
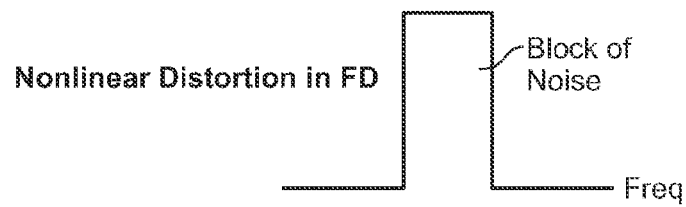
FIG. 2A is a spectral plot showing a signal with a rectangular spectrum.
Figure 2B:
FIG. 2B is a spectral plot of $2^{nd}$ order distortion.
Figure 2C:
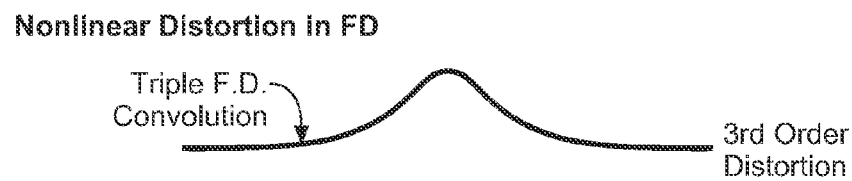
FIG. 2C is a spectral plot of $3^{rd}$ order distortion.
Figure 2D:
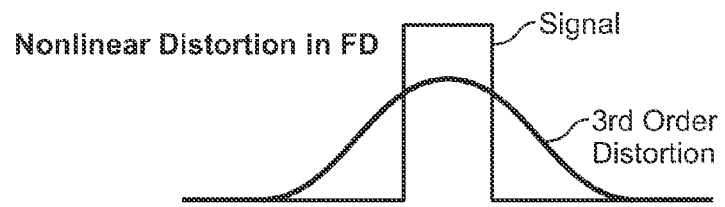
FIG. 2D is a spectral plot showing $3^{rd}$ order nonlinear distortion and the signal of FIG. 6A that created it.

FIGS. 2A-2D are diagrams showing how nonlinear distortion is created in the frequency domain. FIG. 2A is an undistorted signal that may be modeled as approximately a rectangular block of random noise. If the undistorted signal is distorted by a second order distortion, the created distortion components will have a triangular spectral shape as illustrated in FIG. 2B. This triangular shape is a result of a double convolution in the frequency domain of the signal of FIG. 2A. The center frequency of the distortion will be double the carrier frequency. Likewise, FIG. 2C is the spectrum of the distortion of the signal in FIG. 2A, distorted by third order distortion. The haystack shape is a result of a triple convolution of the signal of FIG. 2A. FIG. 2D is a superposition of the signal of FIG. 2A with the nonlinear distortion of FIG. 2C. Observe that some of the distortion energy is underneath the signal, and some distortion energy spreads into the upper and lower adjacent bands. Note that a repeated signal will generate a repeated nonlinear distortion signature if the channel is memory-less, or if the time between repetitions is greater than the channel's memory.

Figure 3:
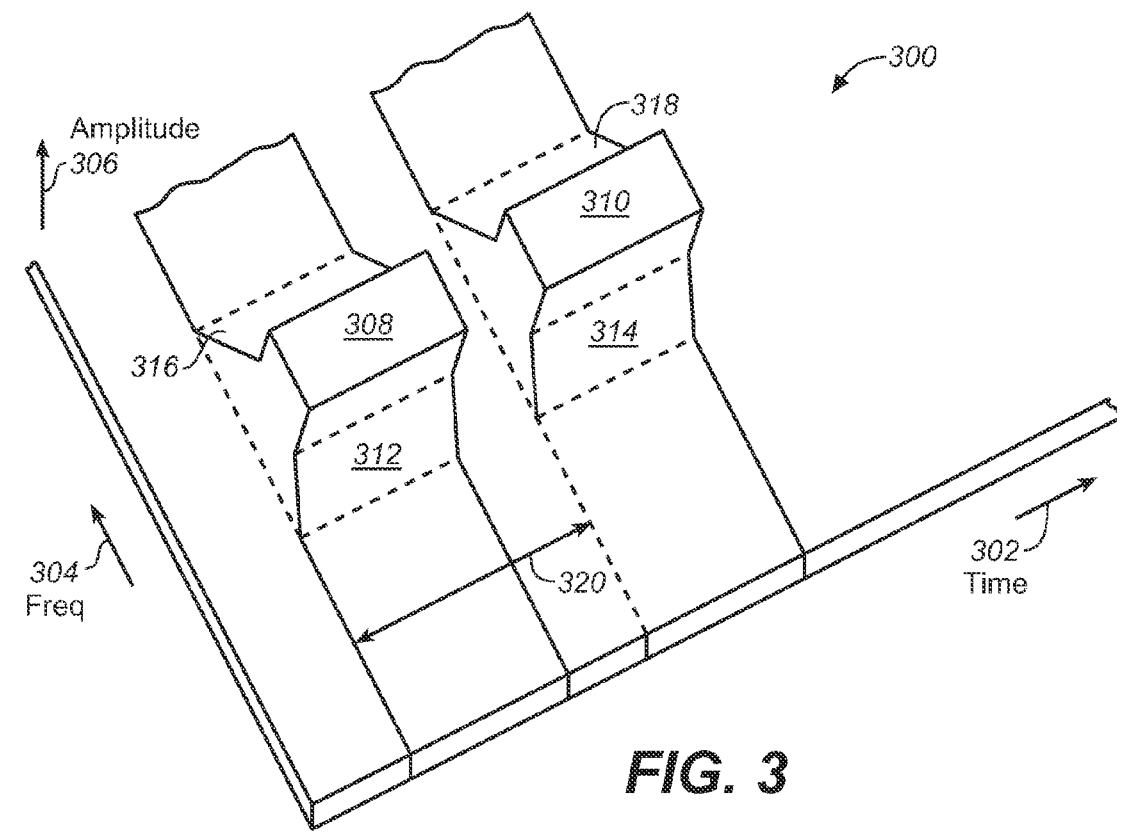
FIG. 3 is a three dimensional graphical plot of two signal bursts sent with t time offset between them and nonlinear distortion side band signals to illustrate one embodiment of the invention.

FIG. 3 is an orthogonal projection plot 300 illustrating two approximately rectangular-shaped bursts transmissions that both make nonlinear distortion. The projection consists of a time axis 302, a frequency axis, 304, and an amplitude axis 306. A first signal or signal burst 308 makes a first nonlinear distortion vacant band signal in a first lower vacant frequency band 312 and a first nonlinear vacant band distortion signal in a first upper vacant frequency band 316 near the frequencies of the burst 308. The terms signals, bursts and signal bursts are used interchangeably herein. The terms frequency band and frequency bandwidth are used interchangeably herein. A second burst 310 makes a second nonlinear vacant band distortion signal in a second lower vacant frequency band 314 and a second nonlinear vacant band distortion signal in a second upper vacant frequency band 318 near the frequencies of the burst 310. Preferably the lower vacant bands 312 and 314 occupy the same frequencies, and upper vacant bands 316, 318 occupy the same frequencies. By processing the first nonlinear distortion signal 312 in the first lower vacant band with the second nonlinear distortion signal 314 from the second lower vacant band, and/or processing the first nonlinear distortion signal 316 in the first upper vacant band with the second nonlinear distortion signal 318 from the second upper vacant band, it is possible to determine if the captured vacant bands' signals, 316, 312, 314, or 318, were created by nonlinear distortion, or some other unrelated uncorrelated source, such as random noise, or a coherent source, such as an ingress from a ham radio or broadcast signal. Knowing an exact time offset 320, between the first burst and the second burst assists the analysis, but is not mandatory. If the exact time offset is not known, the correlation peak will be moved from the 0th term to another term. But it should be stable and thus observable. The time between transmissions of the first burst and the second burst is preferably long enough that linear distortion is not involved. Note that the time difference between the two bursts 308 and 310 will also be the time difference between distortion signals 312 and 314, assuming the signal path does not have a memory, or the time difference is greater than the memory duration.

Figure 11A:
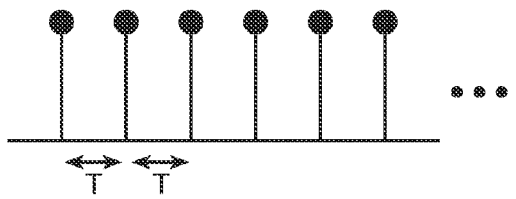
FIGS. 11A, 11B are graphical representations of a comb signal in signal level versus time plots that can be used to detect non-linearity using a single burst method to illustrate embodiment of the invention. A unipolar comb signal is shown in 11A, and a bipolar comb signal is shown in 11B.

Note that if an upper vacant frequency band 316 and a lower vacant band 312 are both available, it is possible to process the nonlinear distortion signals in the upper band and lower band to determine if they were created by the same signal 308. This could be done, for example by using a comb signal as a test signal. A comb signal is a sequence of periodic impulses in the time domain; a comb signal in the time domain is also a comb signal in the frequency domain. A double or triple frequency domain convolution of a comb signal with itself will generate matching nonlinear distortion components in both the upper and lower sidebands. The comb signal can be either unipolar (all impulses of the same polarity as in FIG. 11A) or a bipolar comb signal (as in FIG. 1113). Using a bipolar comb signal enables differentiating whether the distortion is caused from a second order or a third order distortion. If the distortion components (impulses) in the upper and lower bands are unipolar, then the distortion is caused by second order distortion while if the components are bipolar, then the distortion is caused by third order distortion. If no distortion components are found, then there is no nonlinearity in the amplifier. This enables detection of nonlinearity in the amplifiers for cases where there are limited vacant bands and limited opportunities to transmit bursts for analysis.

Figure 5:
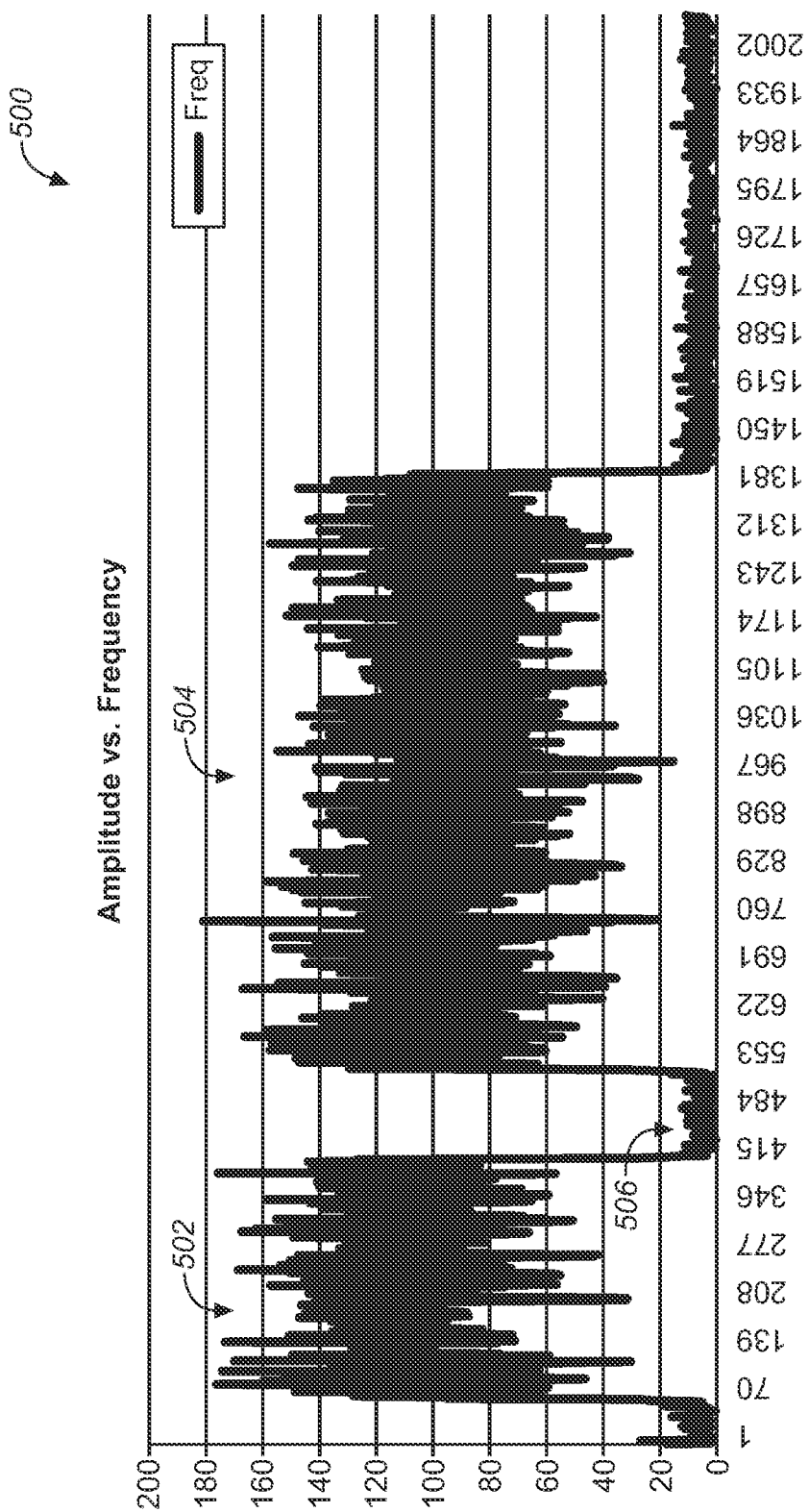
FIG. 5 is a graphical illustration of the spectral components of one of the signals in FIG. 4.

Additionally, if a vacant band is available at certain time intervals, where the bursts have no energy in certain frequency band(s) (e.g. spectral hole (a.k.a.vacant band) 506 in FIG. 5, and no bursts that cause non-linear distortion components to appear in the vacant band are being transmitted, then by processing two or more independent captures of the vacant band taken at consecutive instances in time, will enable the detection of underlying interference or ingress signals not attributed to thermal noise or additive white Gaussian noise.

Figure 4:
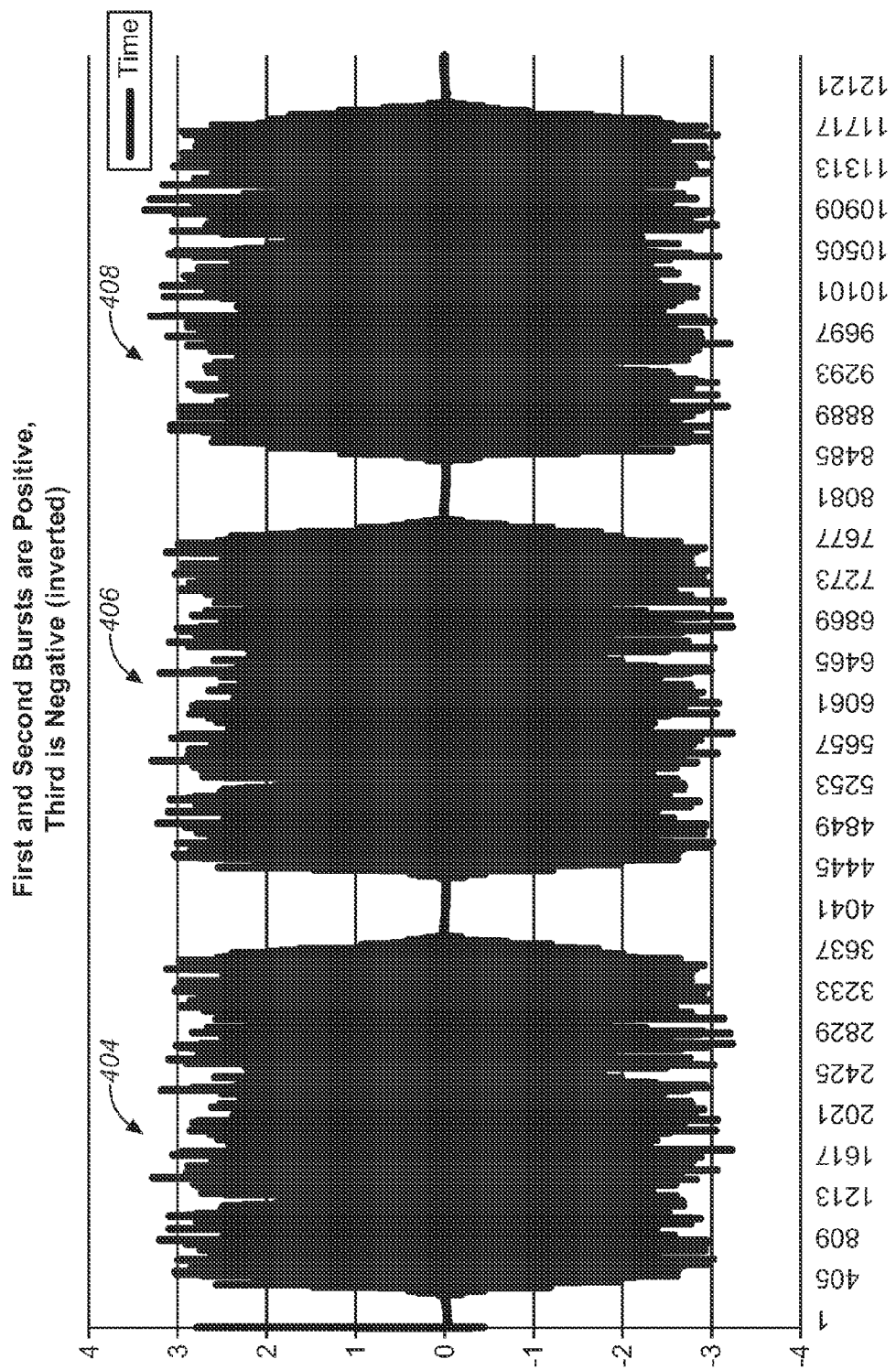
FIG. 4 is a graphical illustration of three signal bursts to illustrate embodiments of the invention.

FIG. 4 is a 3-burst temporal plot of a Cable downstream broadband signal with nonlinear distortion. This signal was generated by a LeCroy ArbStudio 1102 arbitrary signal generator passed at a high level through a ATX QDE-Jr 200 MHz amplifier, and captured on the LeCroy digital 12-bit oscilloscope. The first burst 404 and the second burst 406 are substantially identical, and the third burst 408 is inverted relative to bursts 404 and 406. The bursts are processed in pairs. Nonlinear distortion was created by over-driving a linear amplifier with a broadband test signal. 8192 time samples were captured with 12 bit resolution using a sampling rate of 250 MSamples per sec. Although it is not apparent in a time domain plote, the amplifier's output should have been higher that it actually is. The nonlinear distortion is not readily apparent in the time domain because it occurs simultaneously with each of the test signals.

FIG. 5 is spectral plot 500 of one of the first burst of the FIG. 4 temporal plot. The test signal had a lower frequency 502 of 5 MHz, an upper frequency 504 of 85 MHz, and a spectral hole (vacant frequency band) 506 between 25 and 35 MHz. The spectral hole 506 contains nonlinear distortion energy caused by overdriving the ATX amplifier. A spectral plot of the second or third bursts would have a similar appearance.

The plot of FIG. 2D and FIG. 5 are similar in that they both contain vacant bands which have nonlinear distortion. They are different in that the plot of FIG. 2D has the vacant band above (and below) the spectrum of the undistorted signal, and FIG. 5 has the vacant band within the spectrum of the undistorted signal. This invention works for both cases.

Figure 6A:
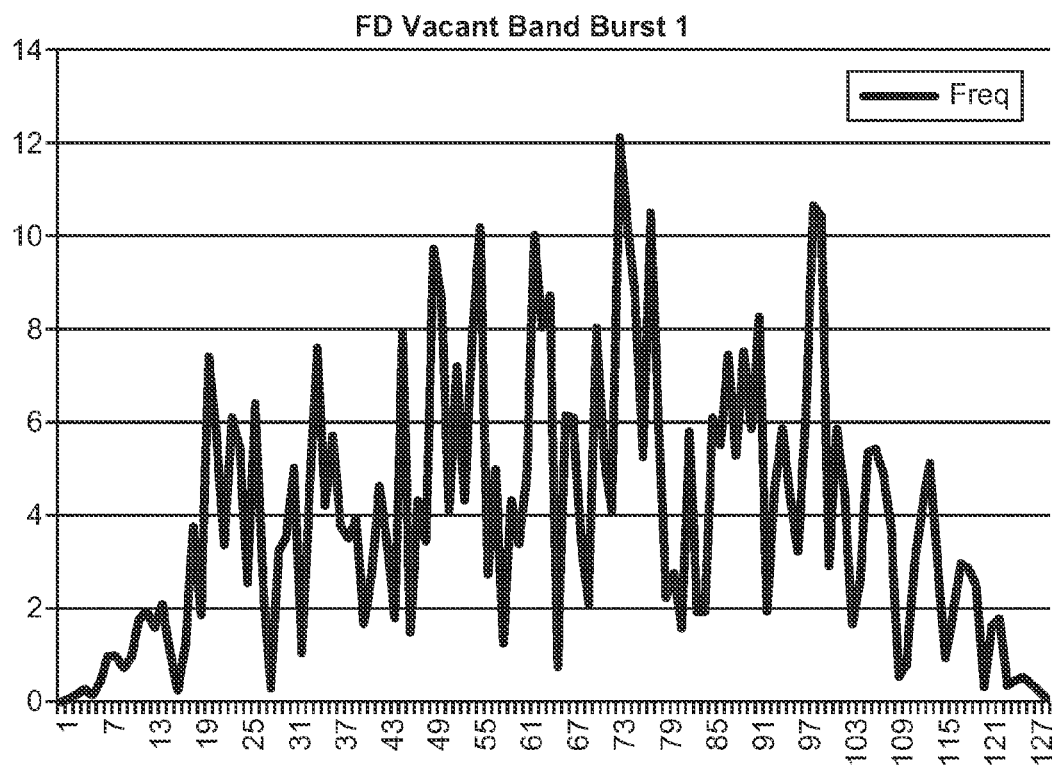
FIGS. 6A, 6B are graphical illustrations of the frequency domain (FD) signals in the vacant band from the two signal bursts sent with a time offset to illustrate one embodiment of the invention.
Figure 6B:
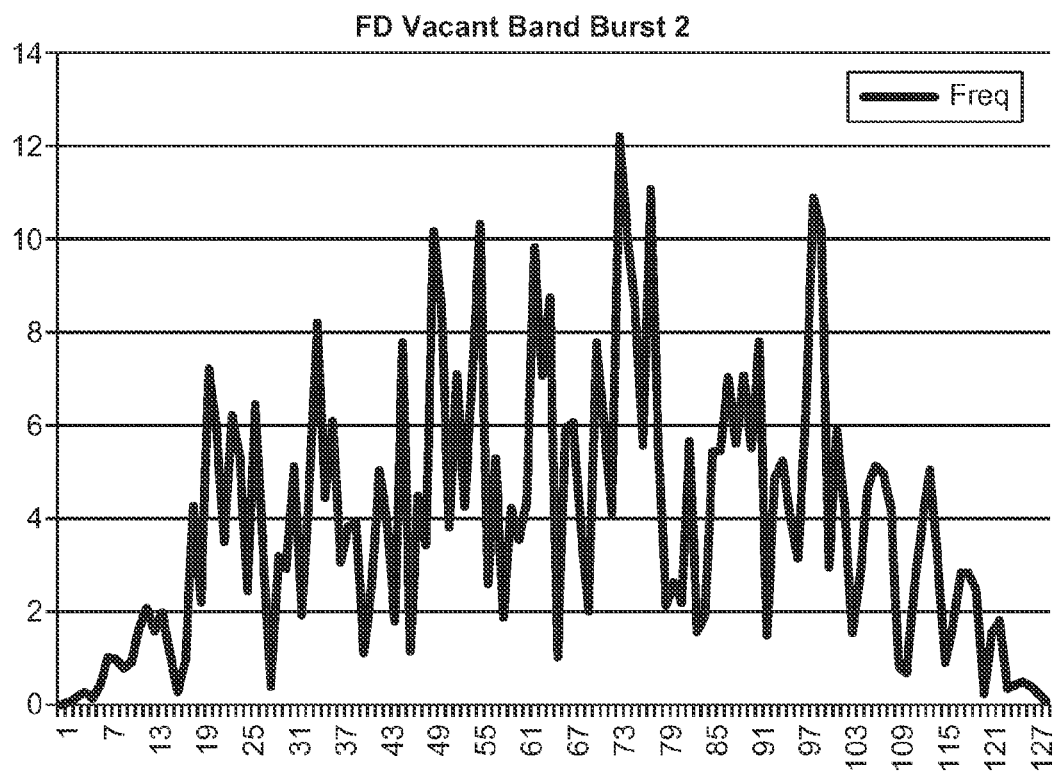

FIG. 6A and FIG. 6B are spectral plots of the energy in the 25-35 MHz vacant band of the first and second bursts respectively. The spectral data, which is 128 samples wide, has (optionally) been windowed with a raised-cosine filter to avoid sharp transitions at the band edges. Because the bursts were substantially identical and the amplifier did not change between bursts, the nonlinear distortion products are nearly identical.

Figure 7:
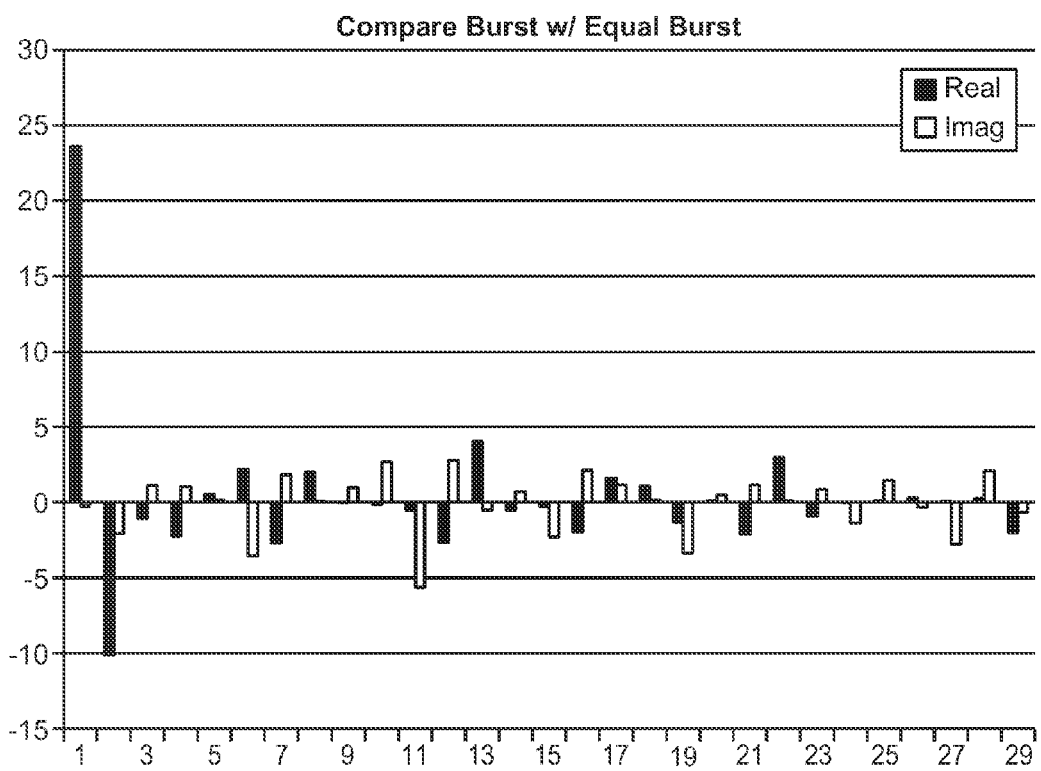

FIG. 7 is a temporal plot obtained by performing a frequency processing of the data of FIG. 6A (first burst's nonlinearity) with the data of FIG. 6B (second burst's nonlinearity), followed by a IFFT. Note that 29 of the 128 points are included on this graph. Note that the processing could have also been done in the time domain with a cross-correlation of the time series associated with the spectral data of FIGS. 6A and 6B. The large term at the $0^{th}$ position indicates nonlinear distortion.

Figure 8:
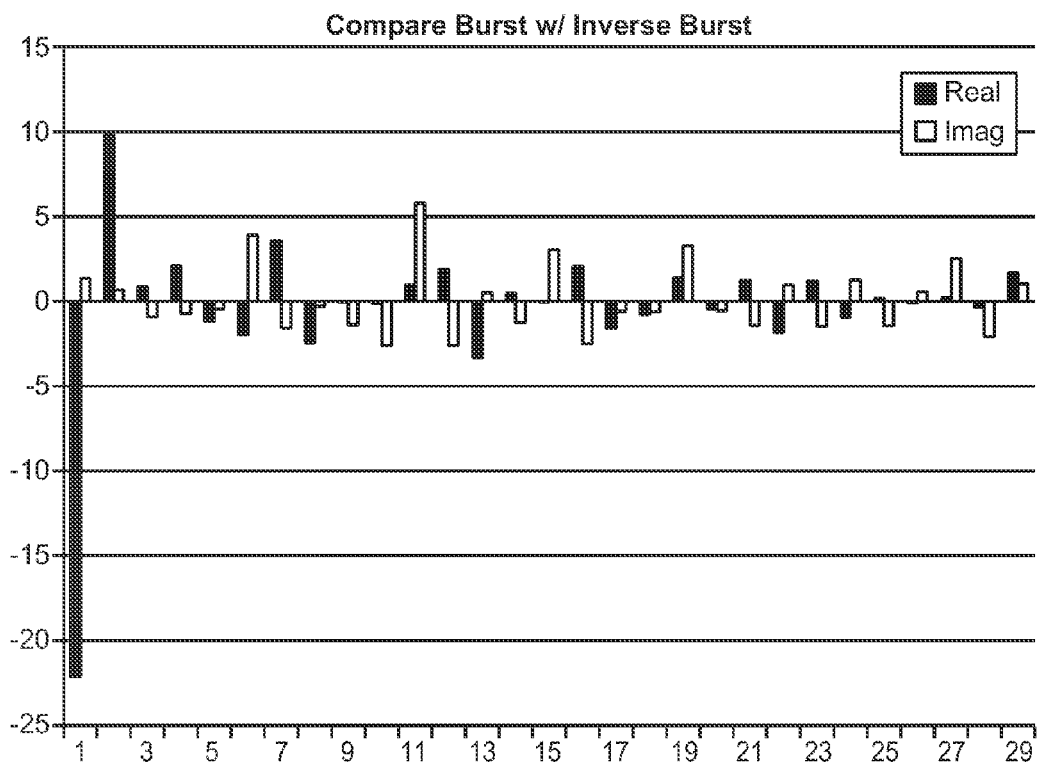

FIG. 8 is a temporal plot obtained by processing the vacant band nonlinear distortion of the first (or second) burst with the vacant band nonlinear distortion of the third burst. Observe that the term of the $0^{th}$ position has inverted in phase relative to FIG. 7. This indicates that the nonlinear distortion was created by odd-order distortion in the ATX overdriven amplifier. This is because the odd-order distortion term, such as the third order distortion term $Cx^3$, preserves the negative sign of x, while an even-order distortion term, such as the second order distortion term $Bx^2$, would be positive.

Processing discussion. There are multiple DSP methods that can be used to determine the level of match between first and second vacant band distortion signals. Experiments have been done on 4 basic methods. Assuming that one of the two vacant band distortion signals is X, and the other one of the two vacant band distortion signals is Y, the methods are:
1. X/Y
2. X*Y
3. X*Y'
4. X/Y'

Where the Y' indicates the complex conjugate of Y. For digital cable signals in the frequency domain, the best result was obtained by method 3.

Processing can be done in polar or rectangular form, with rectangular processing being computationally easier.

Figure 9A:
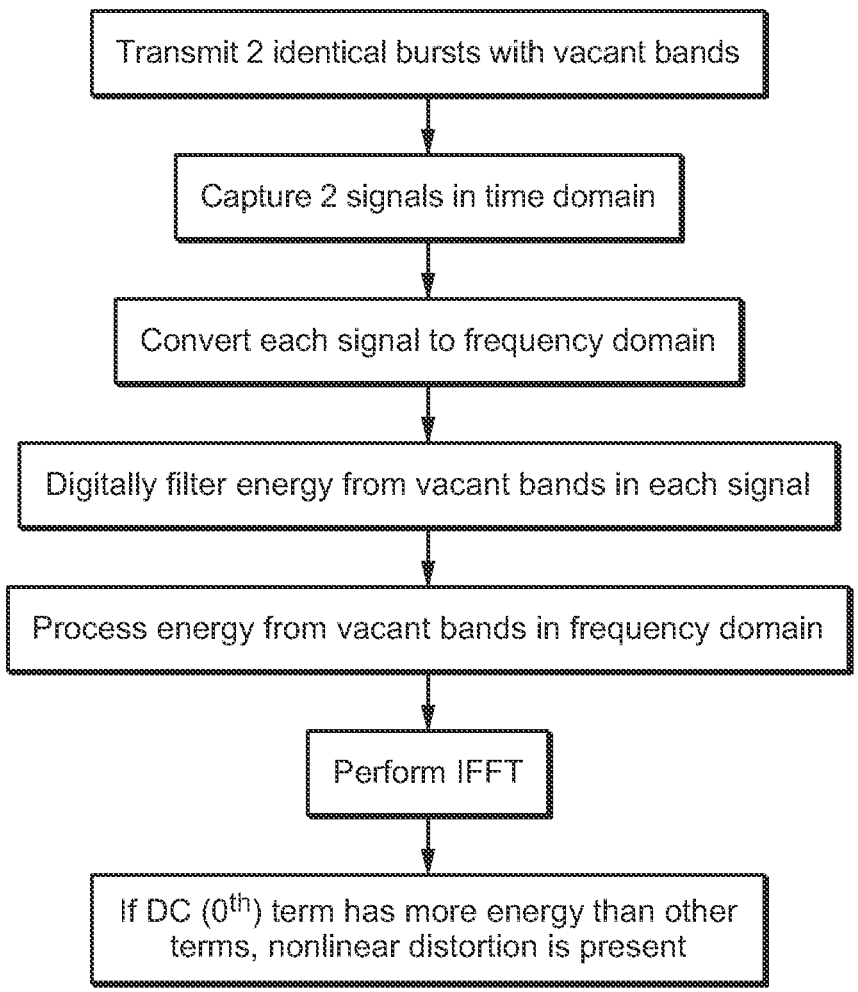
Figure 9B:
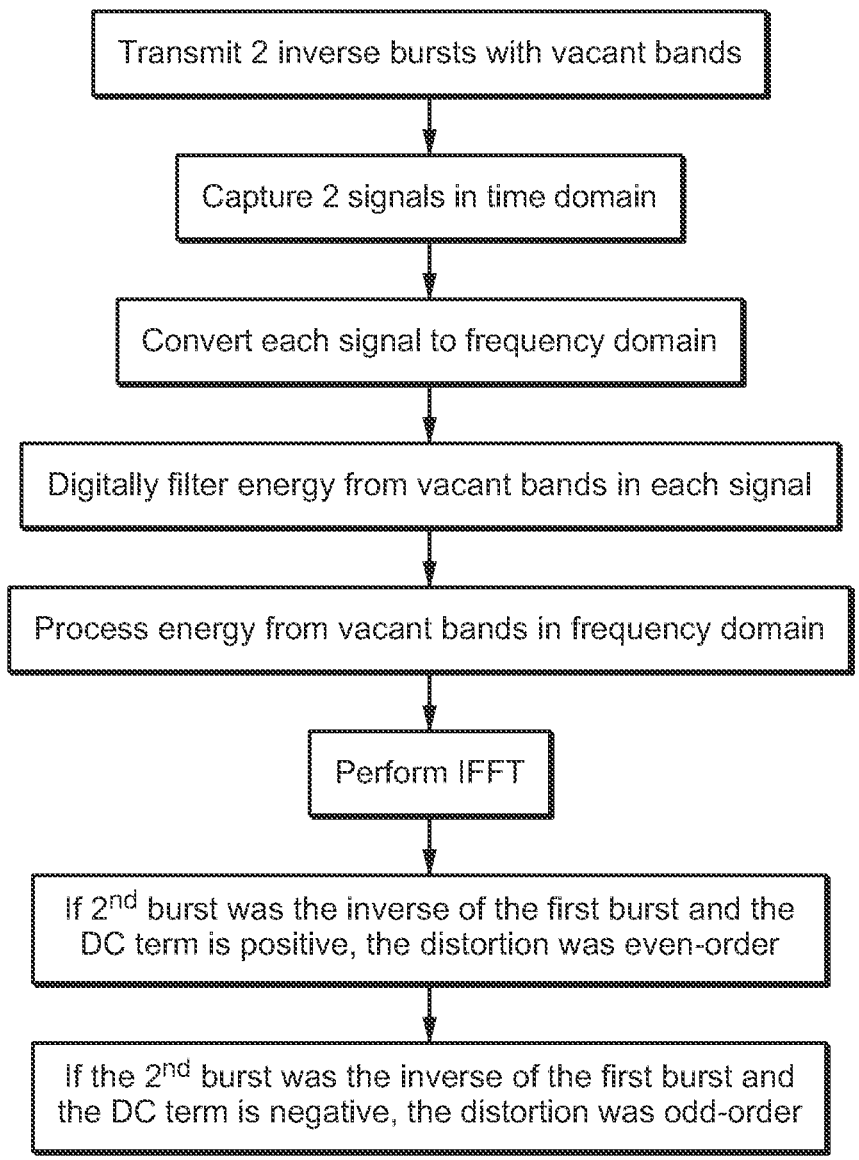
FIG. 9B is a flow chart illustrating the steps of processing the captured signals where a signal burst and its inverse were sent with a time offset there between FIG. 10A, 10B are flow diagrams to determine nonlinear distortions using a vacant spectrum by processing a measured distortion and manufactured distortion to illustrate another embodiment of the invention.

FIG. 9A is the flow diagram with two substantially identical bursts. FIG. 9B is a flow diagrams with two bursts that are substantially inverses of each other in the time domain.

Processing as mentioned above, can also be done in the time domain (TD) as a cross-correlation between two time-series representations of the filtered FD data. In such a case, there is no need to convert the TD data to FD data. The filtering now in step 4 of FIG. 9A may be performed digitally in the TD instead by convolving the TD data with a bandpass filter response that blocks out all frequency components except the band(s) with the nonlinear distortion. Cross-correlations can be real or complex, and are well-known in the art. In the case of a time domain convolution, the number of resulting terms will be 2*n−1 where n is 128 in this example. Similar modifications as those above for FIG. 9A may be made for the flow diagram of FIG. 9B for signal processing in the TD instead of FD.

In Cable amplifier cascaded, additional small nonlinear distortions should normally be added at each amplifier output in a cascade. So when a sudden large jump of distortion is measured at the output of a cable amplifier, the amplifier can be assumed to be damaged or operating at incorrect signal levels. Likewise, since Cable line amplifiers are push-pull type to cancel $2^{nd}$ order distortions, and elevated second order distortion is measured, the amplifier can assumed to be damaged (e.g. a final amplification stage is pushing more than it is pulling), or possibly another nonlinear element, such as a corrosion-created diode, is in the signal's path Another mechanism that can create $2^{nd}$ order distortion is the laser diode in the signal path. Typically laser diodes are of the Fabry-Perot or DFB (distributed feedback) construction.

In testing for nonlinear distortion, a goal is to determine two things, how much energy is in the vacant band, and what the nature of the energy is in the vacant band. If the vacant band energy level is low, the nature of the energy is less important, as no repair is required.

The amplifiers and other equipment in wireless systems 200 may also experience the same type of impairment and give rise to second, third or still higher orders of distortions. The flow diagrams of FIGS. 9A and 9B described below also apply to wireless systems 200.

In a preferred embodiment, the measurements will be made by a CMTS receiving signal bursts from a CM. A vacant band may be created for this measurement by a CMTS (cable modem termination system) and last a very short time. Upstream transmissions are controlled by the CMTS and are sent in bursts with transmission opportunities being assigned in "minislots" to requesting CMs via a map message over the downstream plant. Thus, the CMTS may instruct a particular CM to send multiple bursts of substantially identical or inverted signal bursts (e.g. signals 404, 406 and 408 of FIG. 4) at certain time intervals, where the bursts have no energy in certain frequency band(s) (e.g. spectral hole (a.k.a. vacant band) 506 in FIG. 5. Alternatively, the bursts may have no energy in frequency band(s) above or below the frequencies of the bursts, such as in the vacant bands 312, 314, 316, 318 shown in FIG. 3. The designated CM then sends these signal bursts at the set times upstream to the CMTS, such as CMTS 402. CMTS 402 then analyzes the bursts. In future DOCSIS transmissions, OFDM(A) will be used for the transmissions. OFDM(A) can allow any desired number of the 4096 or 2048 component subcarriers to have a value of zero. This flexibility creates a vacant band for the OFDM(A) symbol period, which could be only 20 or 40 microseconds. Alternately, every other subcarrier, such as the even numbered subcarriers, could have zero value, creating a partially-vacant band. The presence of nonlinear distortion can be measured in the vacant, or partially-vacant band on an OFDM(A) transmission. In this embodiment, it would be desirable to synchronize the sample capture period with the OFDM(A) symbol period. The vacant band can be included in a transmitted OFDM(A) signal and the cyclic prefix (or guard interval) can be used as the repeated signal.

As instructed by the CMTS, a particular CM (e.g. the one in home 144 of FIG. 1A) may transmit along the upstream signal path two substantially identical signal bursts with vacant bands, such as the signals 404 and 406 of FIG. 4. The vacant band does not need to be between the frequencies of the signals energy as in the hole 506 of FIG. 5, but may be at frequencies higher or lower than the frequencies (e.g. 312 and 316) of the signals bursts as shown in FIG. 3. This is the first step in the flow chart of FIG. 9A. The two signal bursts are captured at the CMTS 402, in step 2 of FIG. 9A. The captured signals are converted to frequency domain using FFT in step 3. Energy in the vacant bands is filtered digitally from each of the captured signals in step 4. Optionally, the energies in the vacant bands can be filtered out from the captured signals in the time domain without conversion to the frequency domain. The energies in the vacant bands of the two captured signals are processed in the frequency domain in step 5 using any one of the processing methods described above. In reference to FIG. 3, for example, the energy in the lower band of burst 308 is processed with the energy in the lower band of burst 310, and the energy in the upper band of burst 308 is processed with the energy in the upper band of burst 310. The processing may use any one of the above noted four different processing methods, (or conversion can be done into the time domain and an cross-correlation can be done). An IFFT is then performed on the processed signals in step 6 to convert to TD. Where the DC term has more energy than other terms, as illustrated in FIG. 7, nonlinear distortion is present, which can be even-ordered or odd-ordered or both.

To distinguish between even-ordered and odd-ordered nonlinear distortion, the CM transmits two signal bursts that are substantially inversed from each other, such as bursts 306 and 308 of FIG. 3 in step 1 of FIG. 9B. The remaining steps 2 through 6 of FIG. 9B are the same as the corresponding steps in FIG. 9A. If the DC term is positive, the nonlinear distortion is even-ordered. If the DC term is negative, the nonlinear distortion is odd-ordered.

If noise reduction is needed, averages can be done by repeating the steps in FIG. 9A or 9B. Thus, pairs of substantially identical signal burst or their inverse may be sent with a time offset between each of the signal pairs as described above. The resulting energy from IFFT in step 6 in FIGS. 9A and 9B may then be averaged to improve signal to noise ratio. This would reduce the effects of the sample size being too small. It is expected that terminals will not have very deep memory for many samples, so averaging will be useful. Experiments indicate averaging, as well as windowing, to be valuable to improve the quality of signal matching.

Note that one embodiment of signal processing was illustrated. Because of the dual nature of time and frequency, processing can be done in the time domain or frequency domain with identical results. Thus the averaging may be performed in the time domain or frequency domain. Other known digital signal processing techniques, such as windowing, zero padding and averaging can improve test results.

Other Comments:

If the vacant band is not wide enough to use a convenient size FFT, such as 128 in the above embodiment, the technique of "zero stuffing" can be used on top of frequencies that are occupied. Likewise, it is possible to zero-stuff to blank out signals that might be occupying a portion of the vacant band.

If a histogram is built of many time domain voltage samples, a resulting distribution curve should look normal, however any deviation of the curve from normal will indicate problems, such as clipping or other nonlinear distortion.

These methods work well on Cable upstream signal paths, where the nonlinear distortions could be caused by either amplifier nonlinearity or by analog laser nonlinearity or clipping, or A-D converter overload. In the case of laser clipping or A-D converter overload, higher order terms in the Taylor series should be considered above the $3^{rd}$ due to the abrupt nature of laser clipping. A cable upstream signal may be evaluated for nonlinear distortion using either the vacant upper and/or lower bands, or by demodulating and subtracting the signal, thereby creating a vacant band where the upstream signal was located.

Another application for the nonlinear testing process is evaluating amplifier performance. This is done by using a broadband repeatable noise-like signal, such as pseudo-noise, with a vacant band as a test signal. This test could be done on a single amplifier on the bench or a cascade of amplifiers in the field. A noise-like repeatable test signal could be generated by transmissions from terminal units in the field.

While nonlinear distortions are normally created by amplifiers or lasers, others sources of nonlinear distortions exist, such as diodes created by corroded metal contacts.

For best test results, if is better if the test signals contain most or all of the signal in the signal path. If the test signal only contains part of the total energy in a channel, the correlation peaks will not be as large.

Technique works for wireless signals as well as audio signals. In the case of a wireless signal, the vacant band can be just above the signal, just below the signal, or the vacant band can be comprised of both bands, as illustrated in FIG. 3. Alternately, the wireless signal, if it can be demodulated, can be subtracted from the channel, and distortion measured in the newly-vacated channel.

One of the signal bursts, such as signal 308 of FIG. 3, may be processed as described in the parent application to determine the presence of nonlinear distortion, in both the downstream and upstream signal paths. When testing the downstream signal path, the measurement described below is performed at the terminal, such as a CM in a home. When testing the upstream signal path, the measurement described below is performed at the CMTS at the hub. After the signal is captured either by the CM or CMTS, first the captured signals in the vacant bands 312 or 316 (or 506) are cut and saved. Then the resulting filtered signal is squared or cubed to create "manufactured" distortions in the bands that were vacated. Detailed operation is described below in reference to FIGS. 10A and 10B which are the same as FIGS. 11A and 11B of the parent application.

Figure 10A:
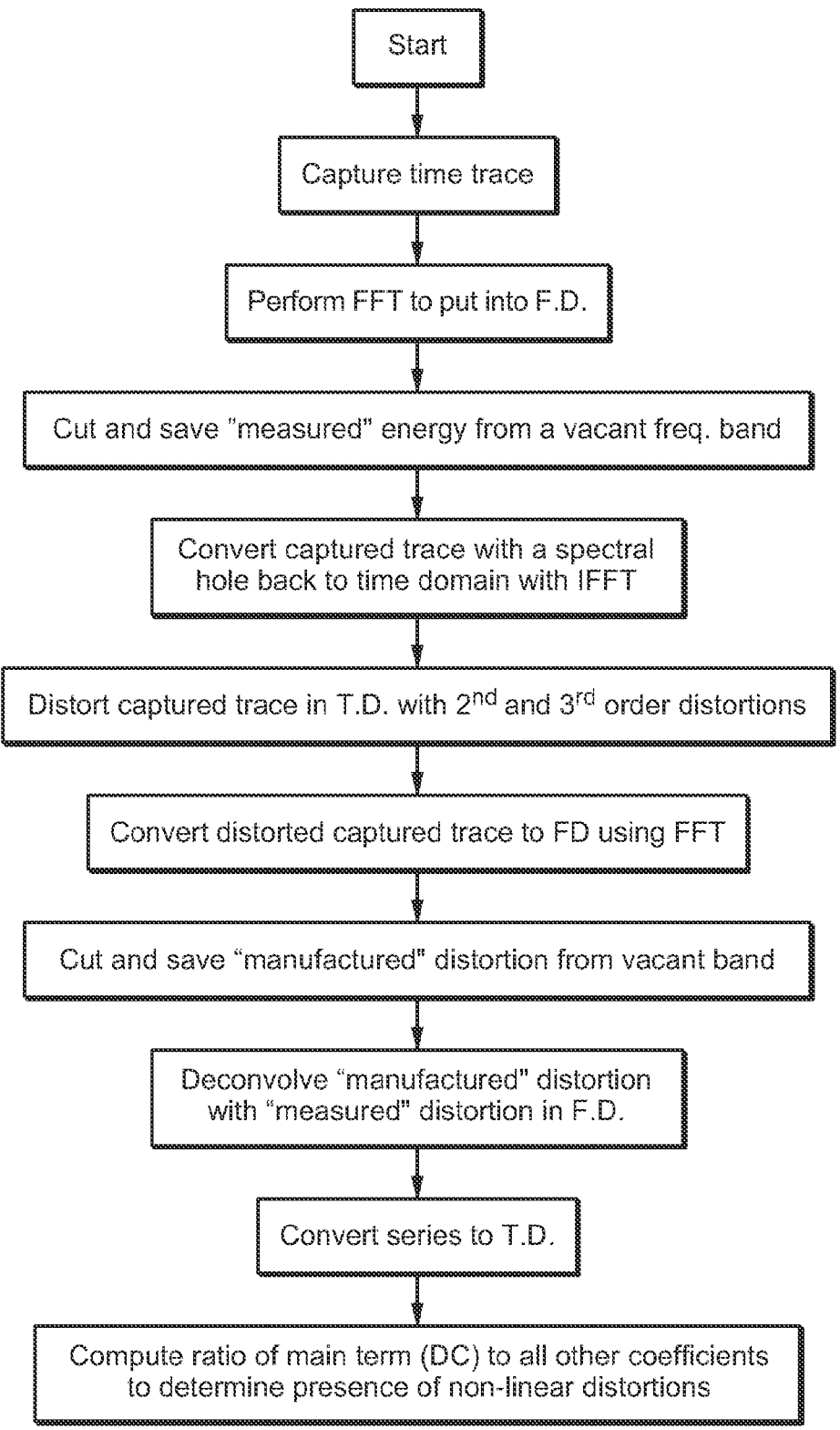
Figure 11B:
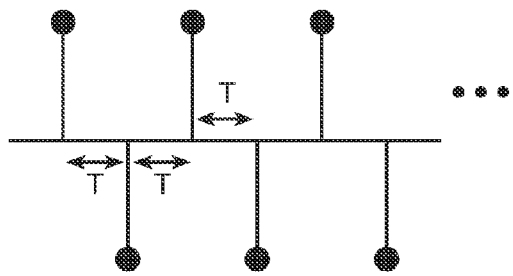

FIG. 10A is a flow diagram for the method to measure nonlinear distortion on a downstream signal in a vacant bandwidth. In a first step the process is started. In a second step the time trace such as 308 with a vacant frequency band is captured. Optionally it can be windowed. In a third step the time trace is transformed with a FFT into the frequency domain. In a fourth step the energy 312, 316 in the vacant band is cut and saved as "measured" values. In a fifth step zeroes (or very small values) are inserted into the vacant band in the FD and the FD data series is converted back again into the TD with an IFFT. In a sixth step the TD data series is distorted by squaring and/or cubing (or higher order) each TD sample, creating "manufactured" distortions in the vacant band. In a seventh step the distorted TD data series is converted to the FD. In an eight step the manufactured distortion energy in the vacant band is cut and saved.

Optional FD windowing on both manufactured and measured data can improve the level of signal matching. In a ninth step the manufactured distortion from the vacant spectrum is processed with the measured distortion from the vacant spectrum. In a tenth step the FD results are converted to the time domain with an IFFT. In an eleventh step, the ratio of the main DC term to all other terms combined is computed. If the ratio exceeds a threshold, the distortion is declared excessive and a repair must be made.

Figure 10B:
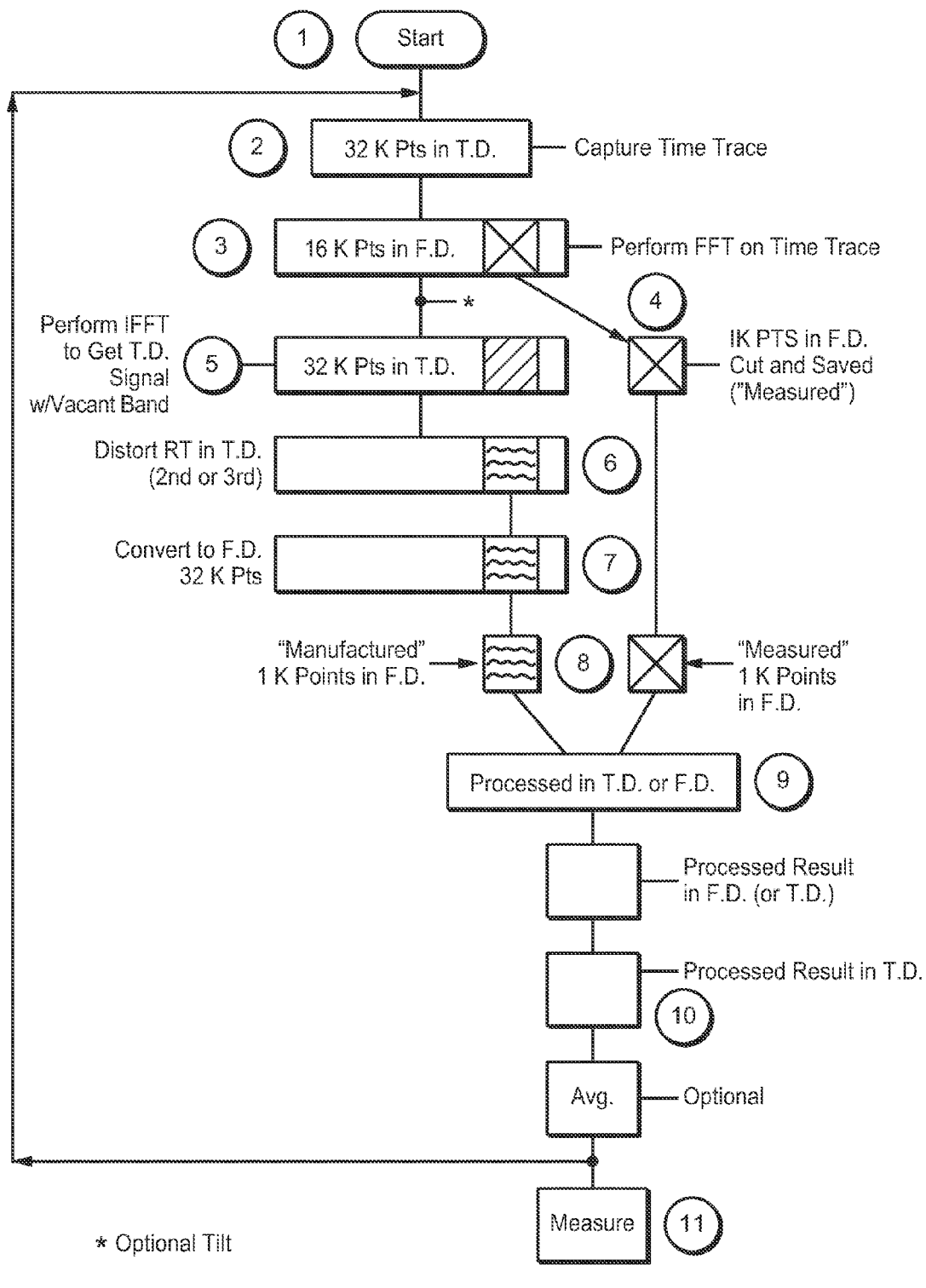

FIG. 10B is a flow diagram that shows in more detail the process of FIG. 10A. In step two, 32768 TD samples are captured from the received signal. In steps three and four, the samples are converted to FD and energy 312, 316 in the vacant band marked "X" is cut and saved as "measured" values in FD or TD. In step five, zeroes (or very small values) are inserted into the vacant band (which appears as a shaded box) in the FD and the data are converted to the TD with a IFFT. In step 6, the TD data is distorted (e.g. by squaring or cubing each TD sample), creating "manufactured" distortions in the vacant band. In step 7, the distorted captured trace is converted to FD by FFT. In step 8, the "manufactured" distortion of 1024 samples in the vacant band is cut out and saved. In step 9, the "manufactured" distortion is processed with the measured distortion from the vacant spectrum to obtain quotients (match coefficients). Step 9 may be performed in TD or FD. Where step 9 is performed in FD, in the tenth step, the FD quotients are converted to the time domain with an IFFT and saved. The above steps one through 10 are optionally repeated before step eleven, by the process returning back to step one, and the 1024 TD quotients obtained in the repeated process are averaged to obtain an average of many quotients. In an eleventh step, the ratios of the main DC term to all other terms combined is computed for the average quotient. The above process may be performed for any order of distortion such as the second or third order or both or more. If one or more of the ratios exceed a threshold, the distortion is declared excessive and a repair must be made.

Thus, two alternative techniques using the signal burst 304 have been described above. One technique comprises sending two substantially identical signals (or a signal and its inverse), and the other comprises sending a single signal, and then processing it to obtain a manufactured distortion in a vacant band for processing with the measured energy in the band. Both techniques may be used together if desired.

If several repetitions of repeated signal are sent with increasing amplitude, nonlinear distortion versus signal level can be determined. For example, the amplitude can be increased until signal clipping is detected.

The discussion above on the parent application was based on having and using a vacant band in the transmission. This produces a very good result that is sensitive to low levels of distortion. However, in some cases a vacant band is not available and an occupied band may be used instead of the vacant band. That is, some of the captured signal is used as a "measured" signal, and the remainder of the captured signal be distorted to make a "manufactured" signal. Processing step for determining distortion in a non-vacant band signal are as follows:

1. Capture a signal containing nonlinear distortion at the same frequency as the signal.

2. Divide the signal into two bands. A first band, say 10 or 20% of the signal, is used to "measure" nonlinear distortion.

A second band, say 80 or 90% of the signal, is used to "manufacture" nonlinear distortion.

3. Process the "measured" distortion with the "manufactured" distortion for similarity (e.g. correlation).

The correlation between these "measured" and "manufactured" signals works because a signal is different from its own co-located (same band) nonlinear distortion. Also, if a signal is random, energy in the first band will not correlate with energy in a second band. However, this occupied-band method is somewhat less sensitive, so more averaging is needed for an equivalent-sensitivity result. In cases where there is no vacant bandwidth or the nonlinear distortion is moderate to severe, experiments have shown this method to work.

The above described techniques for nonlinear distortion analysis may be carried out using the MATLAB code attached hereto as Appendix A. Where the nonlinear distortion detection relies on having and using a vacant band in the transmission, the frequency numerical index in the MATLAB code is set on a vacant band. Where the nonlinear distortion detection relies on having and using an occupied band (e.g. occupied with data or test signals) in the transmission, the frequency numerical index in the METLAB code is set on an occupied band.

Another technique for detecting non-linearity is by transmitting a single burst 308 comprising of a unipolar or bipolar comb signal (FIG. 11A, FIG. 11B) in a band, and processing the components in the upper and lower adjacent bands (316 and 312 respectively).

As instructed by the CMTS, a particular CM (e.g. the one in home 144 of FIG. 1A) may transmit along the upstream signal path a comb signal (FIG. 11A or FIG. 11B) with adjacent vacant bands, such as the signal 308 of FIG. 3. The vacant bands are adjacent to the transmitted burst band similar to the bands occupied by signals 312 and 316 of FIG. 3. The transmitted signal burst is captured at the CMTS 402 in step 1 of FIG. 12. The captured signal is converted to frequency domain using FFT in step 2 of FIG. 12 and the energy in the adjacent bands are filtered digitally from the captured signal in step 3 of FIG. 12. Optionally, the energies from the adjacent bands can be filtered out in the time domain without conversion to the frequency domain in step 3 of FIG. 12, and processed in the TD by convolving with a bandpass filter response as described above in reference to FIGS. 9A, 9B.

Figure 12:
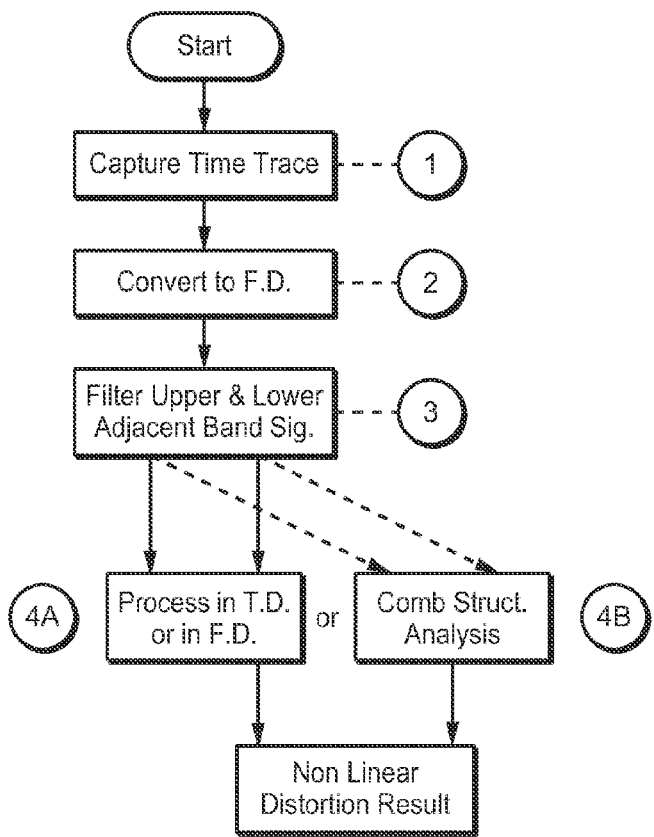
FIG. 12 is a flow chart illustrating the steps of processing the captured signals that originated from a comb signal to illustrate the embodiment of FIGS. 11A, 11B.

The energies in the adjacent bands (e.g. 312, 316) of the captured signals are processed in the frequency domain using any one of the previously noted four different processing methods; or a cross-correlation can be done in the time domain in step 4A of FIG. 12; where a correlation of the signals in the upper adjacent band and the lower adjacent band is indicative of non-linear distortion. Alternatively, the presence of a comb-structure signal observed in the frequency domain in the upper and lower adjacent bands is indicative of non-linear distortion in step 413 of FIG. 12. Further distinction of the type of distortion (even-ordered distortion or odd-ordered distortion) can be identified by using a bipolar-comb signal in the transmission burst (308 of FIG. 3). The presence of a unipolar comb structure in the upper or lower adjacent bands is indicative of the presence of even-ordered distortion, while the presence of bipolar comb structure is indicative of the presence of odd-ordered distortion and possibly even-ordered distortion in the amplifiers.

Figure 13A:
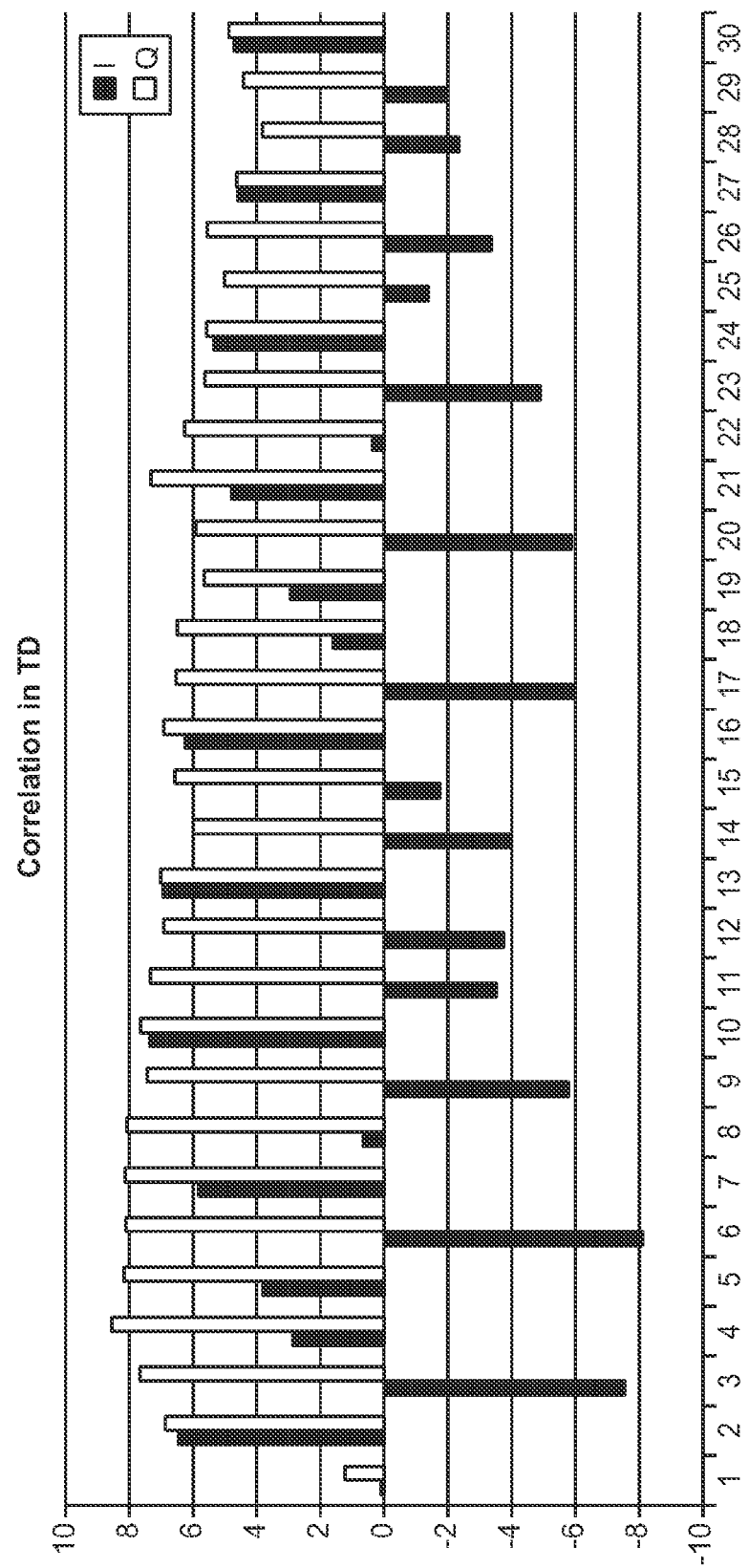
FIGS. 13A, 13B are graphical representations of the result of the correlation in time domain (TD) of the FD signals in FIGS. 6A, 6B obtained where a continuous wave interferer present in the vacant band (30 MHz) is producing a response (correlation in TD) that is both without a DC correlation peak and non-random in appearance.
Figure 13B:
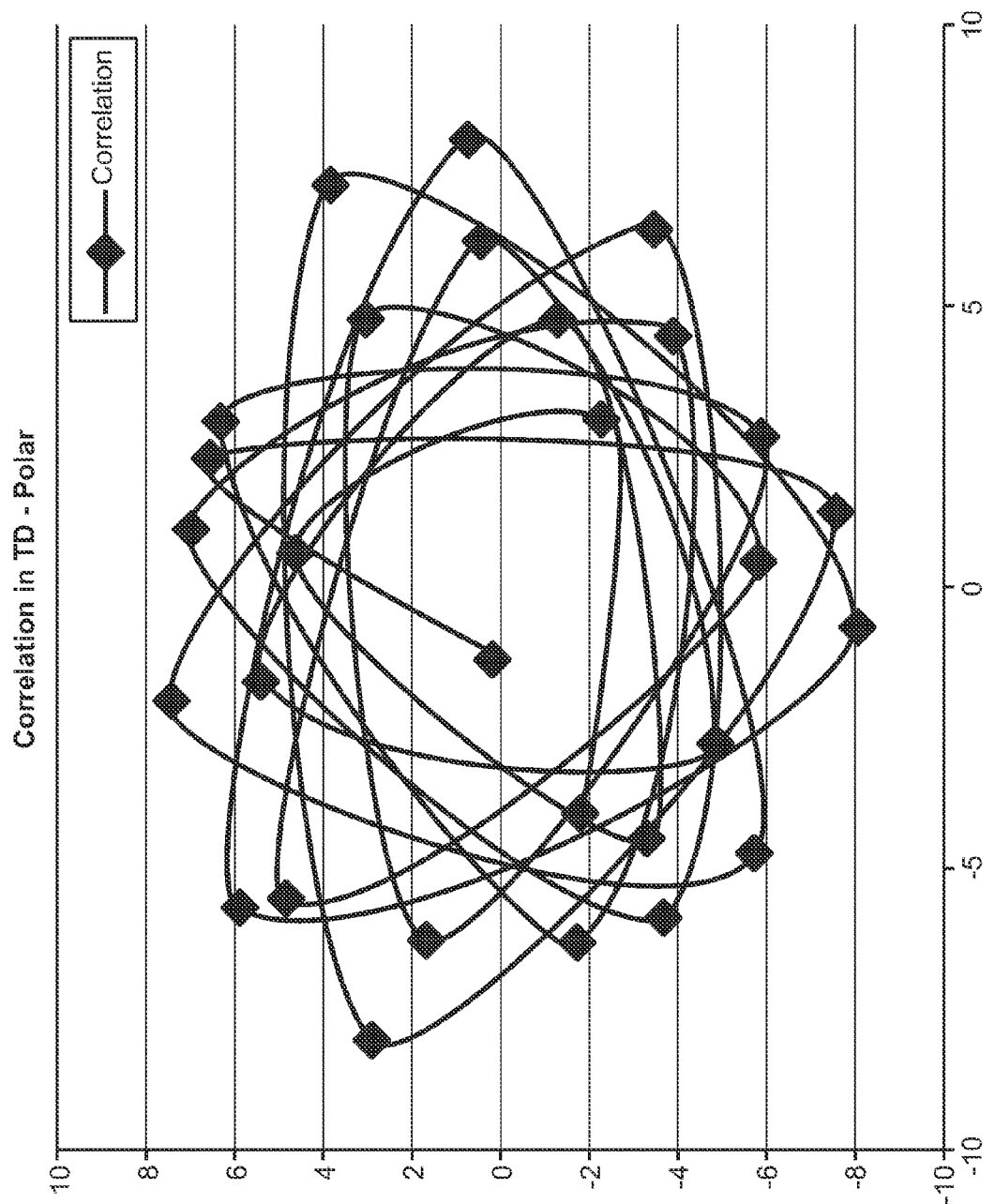

If there is energy present in the first and the second vacant band and the energy is random noise, there will be just an average value for the DC term in the resulting correlation plot. If the energy is nonlinear distortion, it will correlate and give a large DC term in the correlation plot, as illustrated in FIGS. 7 and 8. This plot will be similar if the test is repeated. If the energy is coherent energy, such as a continuous wave (CW) signal, which may be caused by an ingressing Ham radio or broadcast signal, the correlation plot will "spin" as illustrated in polar form in FIG. 13B and in I-Q vs. time in FIG. 13A. If the time delay between the first and the second bursts is not exactly known, and there is nonlinear distortion, the correlation peak will move from the DC position (0th term) to another term, associated with the time offset error. Thus the correlation plot can reveal nature of the energy. While the invention has been described above by reference to various embodiments, it will be understood that changes and modifications may be made without departing from the scope of the invention, which is to be defined only by the appended claims and their equivalents.

What is claimed is:

1. A method for determining the presence of nonlinear distortion in a signal transmitted from a source and received at a site comprising:
    transmitting a first signal from the source to the site, said first signal associated with a first vacant bandwidth;
    after the first signal has been transmitted, transmitting a second signal from the source to the site, said second signal being a known mathematical function of the first signal and associated with a second vacant bandwidth;
    obtaining in the first vacant bandwidth first vacant band signal samples from the first signal received at the site and in the second vacant bandwidth second vacant band signal samples from the second signal received at the site;
    processing the first and second vacant band signal samples to arrive at processed signal samples and to measure nonlinear distortion in the first and second signals that arrive at the site.

2. The method of claim 1, wherein said first and second signals are genuine data signals.

3. The method of claim 1, wherein said first and second signals are fabricated test signals.

4. The method of claim 1, wherein said first and second signals are substantially time inverse of one another.

5. The method of claim 1, where said first and second signals are substantially the same.

6. The method of claim 1, wherein said first and second signals are OFDM signals.

7. The method of claim 1, wherein said processing includes time domain convolution.

8. The method of claim 1, wherein a time delay between the start of said first signal and start of said second signal is set to a predetermined value.

9. The method of claim 1, wherein said processing includes one of the following calculations, where one of the first and second signals is X and the remaining one of the first and second signals is Y:

X/Y
X*Y
X*Y'
X/Y' where the Y' indicates the complex conjugate of Y.

10. The method of claim 1, wherein the first and second signals are inverse of one another in time, and the presence of a positive DC term in said processed signal samples indicates even-order order distortion in the first and second vacant band signal samples.

11. The method of claim 1, wherein the first and second signals are inverse of one another in time, and the presence of a negative DC term in said processed signal samples indicates odd-order order distortion.

12. The method of claim 1, wherein said transmitting transmits sequentially from the source to the site three signals which include the first, the second and a third signal, where two of the three signals are substantially the same and substantially an inverse of the remaining one of the three signals.

13. The method of claim 12, wherein said processing processes the two of the three signals that are substantially the same, and processes two of the three signals that are substantially an inverse of one another to identify odd-ordered and even-ordered nonlinear distortion in the three signals received at the site.

14. The method of claim 1, wherein pairs of signals that are substantially the same or substantially inverse of one another are transmitted with a time delay between the transmission of the signals in each of the pairs from the source to the site, each signal of the pairs associated with a vacant bandwidth, and wherein a pair of vacant bandwidth signal samples are obtained from each of the pairs of signals arriving at the site within the associated vacant bandwidths of such pair of signals and processed to derive processed signal samples and to measure nonlinear distortion in the pairs of signals received at the site.

15. The method of claim 14, wherein the processed signal samples are averaged to improve signal to noise ratio.

16. The method of claim 14, wherein said averaging is performed in the frequency domain.

17. The method of claim 1, wherein said processing is performed in the time domain, and said processing includes cross-correlating the first and second vacant band signal samples.

18. The method of claim 1, wherein said transmitting and receiving are repeated with signals at varying signal levels, to test a clipping signal level of a transmission between the source and the site.

19. The method of claim 1, wherein said first and second vacant bandwidths are substantially the same.

20. The method of claim 1, wherein said first and second vacant bandwidths are below or above the frequencies of the first and second signals respectively.

21. The method of claim 1, wherein said first and second bandwidths occupy spectral holes within the respective spectra of the first and second signals.

22. The method of claim 1, wherein said transmitting transmits to a cable modem termination system from a cable modem.

23. The method of claim 22, wherein said cable modem termination system processes the first and second signal samples.

24. The method of claim 1, wherein said transmitting transmits to a wireless base station from a hand held device or from a hand held device to a wireless base station.

25. The method of claim 1, wherein said processing also identifies non-random signals, that include interference or ingress signals, or both.

26. The method of claim 1, further comprising:
removing from the first or second signal energy received at the site in the vacant bandwidth associated with such signal to obtain a third signal;
nonlinearly distorting said third signal to create manufactured third signal samples in said vacant bandwidth associated with the first or second signal from which energy has been removed;
processing said first or second signal samples with said manufactured third signal samples to measure nonlinear distortion in the signals received at the site.

27. The method of claim 1, wherein said processing is performed in the frequency domain.

28. A method for determining the presence of nonlinear distortion in a signal transmitted from a source and received at a site comprising:
transmitting a comb signal from the source to the site, said comb signal associated with two vacant bandwidths;
capturing the comb signal transmitted from the source and received at the site;
obtaining from said comb signal received at the site a signal sample in each of the two vacant bandwidths to create two signal samples;
processing said two signal samples to measure nonlinear distortion in the comb signal received at the site.

29. The method of claim 28, wherein one of said two vacant bandwidths is below the frequencies of the comb signal, and the other one of said two vacant bandwidths is above the frequencies of the comb signal.

30. The method of claim 28, wherein the comb signal is a unipolar or bipolar comb signal.

31. The method of claim 28, wherein the comb signal is a bipolar comb signal, so that presence of a unipolar comb structure in one of the vacant bandwidths of the received comb signal indicates presence of even-ordered nonlinear distortion in the comb signal received at the site, and presence of a bipolar comb structure in one of the vacant bandwidths of the received comb signal indicates presence of odd-ordered nonlinear distortion in the comb signal received at the site.

32. The method of claim 28, wherein said removing and said processing are performed in the frequency domain.

33. The method of claim 28, wherein said removing and said processing are performed in the time domain, and said processing includes cross-correlating the two signal samples.

34. The method of claim 28, wherein said processing includes one of the following calculations, where one of the first and second signal samples is X and the remaining one of the signal samples is Y:

X/Y
X*Y
X*Y'
X/Y' where the Y' indicates the complex conjugate of Y.

35. The method of claim 28, wherein the obtaining includes removing energy from said comb signal received at the site, and the energy removed from each of the two vacant bandwidths forms one of the two signal samples.

36. A method for determining the presence of nonlinear distortion in a signal transmitted from a source and received at a site comprising:
capturing samples of the signal received at the site;
obtaining a measured signal from some of the samples of the signal received at the site;
distorting some of the samples of the signal to create a manufactured signal;
processing the measured signal and the manufactured signal to measure nonlinear distortion in the signal transmitted from the source and received at the site.

37. The method of claim 36, wherein the processing includes correlating the measured signal and the manufactured signal.

38. The method of claim 36, said samples having a bandwidth, said method further comprising:
dividing the bandwidth into a first frequency band and a second frequency band that are different from each other;
wherein the measured signal is obtained from the signal samples in the first frequency band;
wherein the manufactured signal is obtained by distorting the signal samples in the second frequency band.

39. The method according to claim 36, wherein said capturing, obtaining, distorting and processing are repeated to obtain a plurality of processing results, said method further comprising averaging said processing results to arrive at an averaged processing result, and wherein said averaged processing result is used to measure nonlinear distortion in the signal received at the site.

\* \* \* \* \*